Dec. 22, 1964   J. J. JASIONOWSKI   3,162,754
PLUG-IN OVEN UNITS
Filed Aug. 10, 1962   2 Sheets-Sheet 1
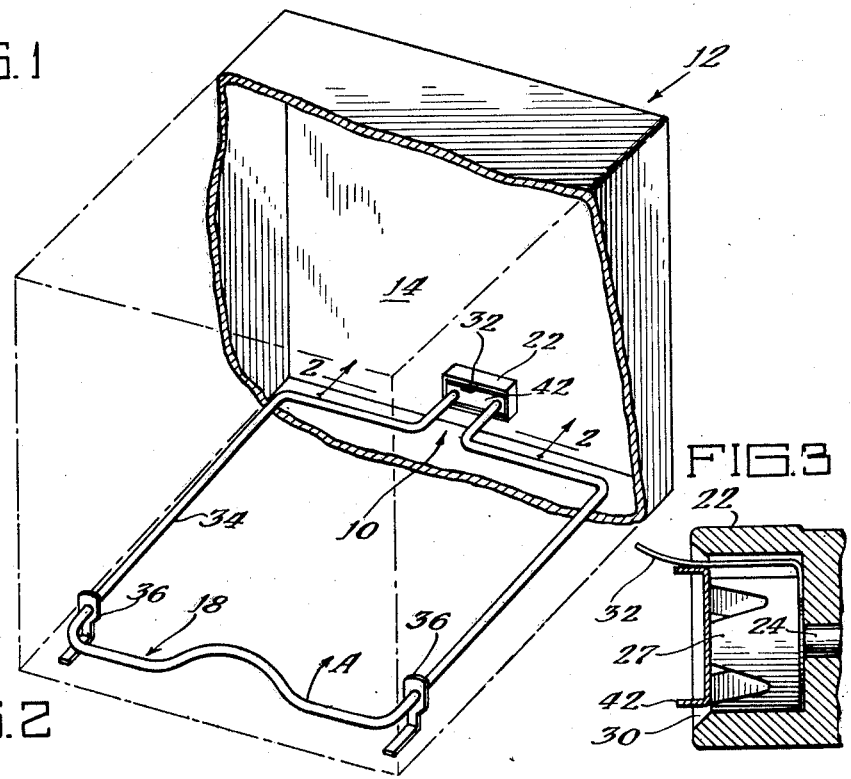
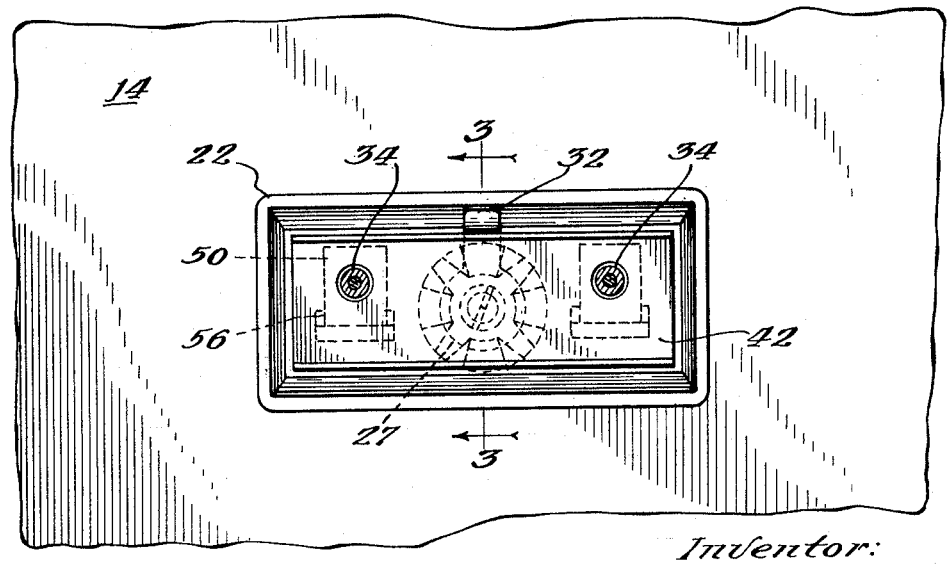
Inventor:
Joseph J. Jasionowski
By: Hofgren, Brady, Wegner,
Allen & Stellman
Attorneys Dec. 22, 1964   J. J. JASIONOWSKI   3,162,754
PLUG-IN OVEN UNITS
Filed Aug. 10, 1962   2 Sheets-Sheet 2
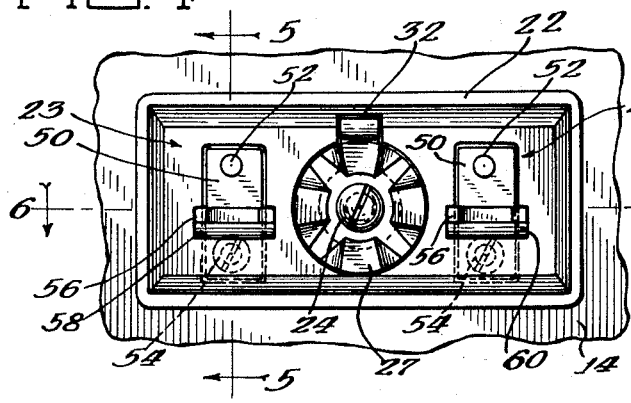
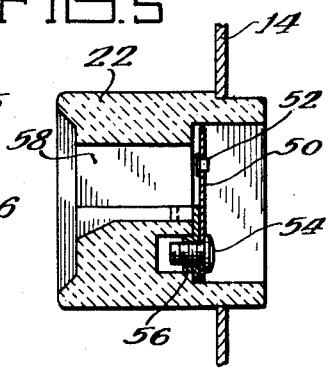
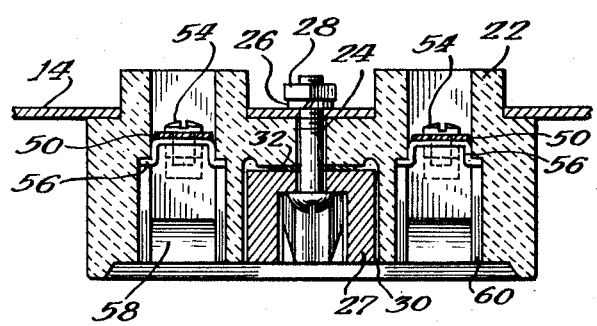
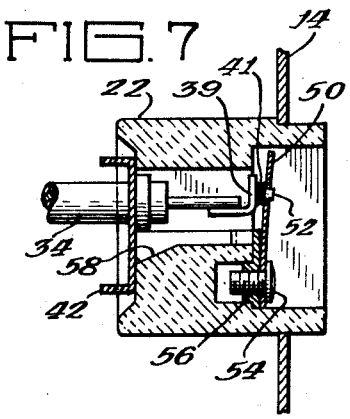
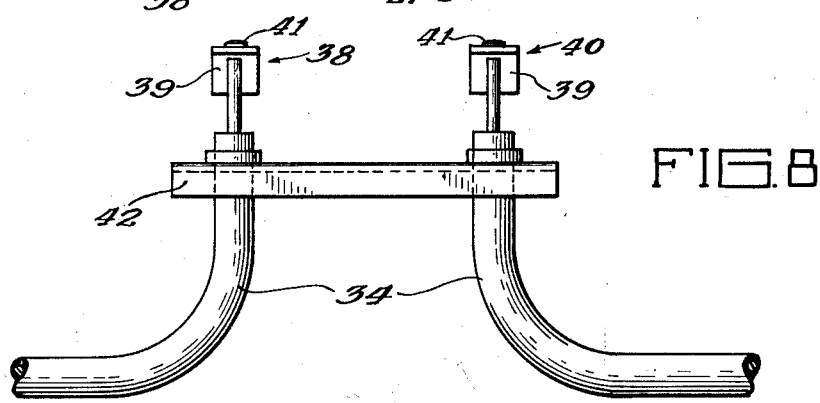

United States Patent Office 3,162,754
Patented Dec. 22, 1964

3,162,754
PLUG-IN OVEN UNITS
Joseph J. Jasionowski, Niles, Ill., assignor to Ferro Corporation, a corporation of Ohio
Filed Aug. 10, 1962, Ser. No. 216,173
1 Claim. (Cl. 219—403)

This invention relates to oven heating elements and connections therefore and more particularly to a plug-in heating element unit and connection including a magnet used for mounting purposes.

It is desirable in oven units to have a heating element unit which is easily removable for replacement or oven cleaning. Also, there are advantages in having a heating element unit which may be installed from the front of an oven so that wall mounted stoves need not be removed when replacing a heating element unit, and heavy appliances need not be moved to gain rear access to wiring. Further, it is desirable that the heating element in an oven unit be simple and require little effort to remove so that it may be removed and replaced by a housewife without the aid of a serviceman.

It is therefore an object of this invention to provide a new and improved heating element and connection for an oven which is simple to remove and install from the front of a stove.

Another object of the present invention is to provide a heating element which requires no tools to install in its oven connection, but is retained therein by a magnetic force.

Still another object of the present invention is to provide a heating element which allows for greater variation in manufacturing tolerances and will not cause undue mechanical wear of the contacts during removal and replacement.

A further object of the present invention is to provide heating element unit connections which are retained in place by one screw and are simple to install, economical to manufacture and durable in use.

Other objects and advantages will become readily apparent from the following detailed description taken in connection with the accompanying drawings, in which:

FIG. 1 is a perspective view of an oven partly broken away, showing a mounting and heating element in accordance with the present invention;

FIG. 2 is an enlarged sectional view of the mounting connection taken along line 2—2 in FIG. 1;

FIG. 3 is a sectional view taken along line 3—3 of FIG. 2;

FIG. 4 is a plan view of the mounting connection of the present invention without the heating element in place;

FIG. 5 is a sectional view taken along line 5—5 of FIG. 4;

FIG. 6 is a sectional view taken along line 6—6 of FIG. 4;

FIG. 7 is a view similar to FIG. 5 with the heating element in place; and

FIG. 8 is a fragmentary view of the heating element, attachment plate, and contacts.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claim.

Referring now to the drawings, FIG. 1 illustrates a heating element unit generally shown at 10 in its environment in an oven 12. The heating element unit 10 is affixed to the rear wall 14 of the oven by means hereinafter described. The heating element unit generally includes the heating coil and attachments 18. An insulator 22 is attached to the oven wall 14 by means of screw 24, washer 26 and nut 28.

Included in the insulator 22 are electrical contacts 23 and 25 which will be described in detail hereinafter. A magnet 27 is held in aperture 30 of insulator 22 by screw 24. Resilient clip 32 is firmly retained between the magnet 27 and the insulator 22 as best shown in FIG. 3, the purpose of which resilient clip will be explained in detail hereinafter.

The heating coil and attachments 18 include the heating coil 34, support legs 36 at the front of the heating coil and contacts 38 and 40, one at each adjacent end of the heating coil 34. A ferrous metal member 42 is attached adjacent the heating element end portions and in operative relation thereto as best shown in FIG. 8.

In operation, the unit is assembled with the magnet 27 and spring clip 32 firmly affixed in the insulator 22. The contacts 23 and 25 (both of which are similar, and only one of which will be described) include a spring clip 50 and a silver contact 52. Spring clip 50 is attached by screw 54 to clip 56 which is retained in aperture 58 of insulator 22. The insulator 22 is attached as described above to oven wall 14. Thus, when the apparatus is affixed to oven wall 14, it includes the insulator 22, with magnet 27, spring clip 32, and contacts 23 and 25 positioned in the insulator.

The contacts 38 and 40 of heating coil 36 are similar to each other, and only one will be described in detail herein. The contact 38 includes a bracket 39 attached to one end of heating coil 34 and has silver contact 41 affixed thereto.

When an electrical contact is desired so that heating coil 34 will conduct and thereby produce heat, the heating coil contacts 38 and 40 are placed adjacent apertures 58 and 60 in insulator 22 as shown in FIGS. 6 and 8. The heating coil is then inserted into the insulator 22 until permeable member 42 contacts magnet 27 as shown in FIG. 7. This places contacts 38 and 40 in contact with contacts 23 and 25 respectively and an electric circuit is completed as is well known in the art, contacts 23 and 25 being connected to the general wiring of the stove (not shown).

Spring clip 32 is at this time in contact with member 42 and causes a friction ground contact thereby rendering the electrical circuit safe.

The heating coil is thus retained in the oven by the magnet 27, however should it be desired to remove the heating coil for any purpose such as repair or cleaning of the oven, it is a simple matter to raise upwardly on the forward portion of the heating coil 34 as at A in FIG. 1. This places a moment about permeable member 42 and breaks the force of the magnet so that the heating coil may be easily removed. The heating coil is then pulled from the insulator 22 and removed from the oven.

In replacing the coil, it is necessary simply to place the contacts 38 and 40 into apertures 58 and 60, and as the coil is pushed into the insulator, the magnet 27 attracts the permeable member 42, and contacts 38 and 40 will be guided by apertures 58 and 60 respectively to meet contacts 23 and 25.

Thus, it has been shown how a simple magnetic force may be used to retain a heating element coil in an oven, hold the coil in place so that a positive electrical contact will be made between the stove wiring and the heating element, and yet provide a means for easily removing the heating coil for cleaning, proper maintenance, and repair of the oven.

I claim:

The combination of an electrical heating element for an oven and means providing a mounting therefor to the wall of said oven comprising: a sheathed electric heating element having two juxtapositioned end portions, a contact secured to each end portion, a ferrous metal plate member secured to said end portions, an insulating block mounted in the wall of the oven, a second pair of electrical contacts mounted in said block and spaced apart a distance equal to the spacing of the first mentioned contacts, and a magnet mounted in said block between the last mentioned pair of contacts and adapted magnetically to hold said plate against said wall to maintain the heating element in position in the oven, said heating element being pivotable to bring the upper edge of said plate against the wall to lever the same away from the magnet to break the magnetic retention of the plate against the magnet to permit easy withdrawal of the heating element.

References Cited in the file of this patent
UNITED STATES PATENTS

| | | |
|---|---|---|
| 2,875,313 | King | Feb. 24, 1959 |
| 2,973,423 | Ammerman et al. | Feb. 28, 1961 |
| 3,038,139 | Bonanno | June 5, 1962 |